United States Patent [19]
Yellin et al.

[11] Patent Number: 6,061,520
[45] Date of Patent: May 9, 2000

[54] METHOD AND SYSTEM FOR PERFORMING STATIC INITIALIZATION

[75] Inventors: Frank Yellin, Redwood City; Richard D. Tuck, San Francisco, both of Calif.

[73] Assignee: Sun Microsystems, Inc., Palo Alto, Calif.

[21] Appl. No.: 09/055,947

[22] Filed: Apr. 7, 1998

[51] Int. Cl.[7] ................................. G06F 9/45; G06F 3/00
[52] U.S. Cl. .................. 395/705; 395/704; 395/500.43; 709/100
[58] Field of Search ................................... 395/705, 707, 395/709

[56] References Cited

U.S. PATENT DOCUMENTS

| | | | |
|---|---|---|---|
| 5,361,350 | 11/1994 | Conner et al. | 707/103 |
| 5,367,685 | 11/1994 | Gosling | 395/707 |
| 5,421,016 | 5/1995 | Conner et al. | 395/707 |
| 5,437,025 | 7/1995 | Bale et al. | 707/103 |
| 5,615,400 | 3/1997 | Cowsar et al. | 709/305 |
| 5,668,999 | 9/1997 | Gosling | 395/704 |
| 5,812,828 | 9/1998 | Kaufer et al. | 395/500.43 |
| 5,815,718 | 9/1998 | Tock | 395/705 |
| 5,903,899 | 5/1999 | Steele, Jr. | 707/206 |
| 5,966,702 | 10/1999 | Fresko et al. | 707/1 |
| 5,999,732 | 12/1999 | Bak et al. | 395/705 |
| 6,003,038 | 12/1999 | Chen | 707/103 |

OTHER PUBLICATIONS

Tyma, P;, "Tuning Java Performance ". Dr. Dobb's Journal [online], vol. 21, No. 4, pp. 52–58, Apr. 1996.
Cierniak et al., "Briki: an optimizing Java compiler". IEEE/ IEEE Electronic Library, Proceedings, IEEE Compcon pp. 179–184, Feb. 1997.
Bell, D.; "Make Java fast: Optimize!". Javaworld[online].
Cramer et al.; "Compiling Java just in time". IEEE Electronic Library[online], vol. 17, Iss. 3, pp. 36–43, May 1997.
Lindholm, Tim et al., The Java Virtual Machine Specification, 1997.
Comar et al.; "Targeting GNAT to the Java virtual machine". ACM Digital Library[online], Proceedings of the conference on TRI–Ada '97, May 1997.
Hsieh et al.; "Compilers for improved Java Performance". IEEE Electronic Library[online]. Computer[online], vol. 30, Iss. 6, pp. 67–75, Jun. 1997.
Armstrong, E.; "Hotspot: A new breed of virtual machine". Javaworld[online].
Gosling et al.; The Java Language Specification. Reading, MA, Addison–Wesley. Ch 12, pp. 215–236, Sep. 1996.

*Primary Examiner*—Tariq R. Hafiz
*Assistant Examiner*—Kelvin E. Booker
*Attorney, Agent, or Firm*—Finnegan, Henderson, Farabow, Garrett & Dunner, L.L.P.

[57] ABSTRACT

The disclosed system represents an improvement over conventional systems for initializing static arrays by reducing the amount of code executed by the virtual machine to statically initialize an array. To realize this reduction, when consolidating class files, the preloader identifies all <clinit> methods and play executes these methods to determine the static initialization performed by them. The preloader then creates an expression indicating the static initialization performed by the <clinit> method and stores this expression in the .mclass file, replacing the <clinit> method. As such, the code of the <clinit> method, containing many instructions, is replaced by a single expression instructing the virtual machine to perform static initialization, thus saving a significant amount of memory. The virtual machine is modified to recognize this expression and perform the appropriate static initialization of an array.

23 Claims, 3 Drawing Sheets

METHOD AND SYSTEM FOR PERFORMING STATIC INITIALIZATION

FIELD OF THE INVENTION

The present invention relates generally to data processing systems and, more particularly, to a method and system for performing static initialization.

BACKGROUND OF THE INVENTION

Java™ describes both a programming language and a programming environment for generating and running platform-independent code. This platform-independent code runs on a Java™ virtual machine, which is an abstract computing machine that interprets the platform-independent code. The Java™ virtual machine is described in greater detail in Lindholm and Yellin, *The Java Virtual Machine Specification,* Addison-Wesley (1997), which is hereby incorporated by reference. The Java™ virtual machine does not specifically recognize the Java™ programming language or any other programming language; instead, the Java virtual machine only recognizes a particular file format, the class file format. A class file contains the Java virtual machine instructions (or byte codes) that constitute the platform-independent code.

As part of running a Java program, a developer performs a number of steps, as shown in FIG. 1. First, a developer compiles a computer program (step 102). Typically, the developer has developed a computer program containing source code in a high-level language, such as the Java programming language, and invokes the Java™ compiler to compile the code. The Java compiler is part of the Java™ software development kit available from Sun Microsystems of Mountain View, Calif,. The Java compiler outputs one or more class files containing byte codes suitable for execution on the Java virtual machine. Each class file contains one type of the Java programming language, either a class or an interface. The class file format is described in greater detail on pp. 83–137 of *The Java Virtual Machine Specification*. Although the class file format is a robust file format, it is unable to instruct the virtual machine to statically initialize an array efficiently, thus posing a problem, discussed in greater detail below.

After compiling the program, the developer consolidates the class files output in step 102 into a single file, known as a .mclass file, by using a preloader (step 104). The preloader also available from Sun Microsystems, Inc., concatenates the class files and performs preprocessing to facilitate the execution of the class files. After consolidating the class files, the developer loads the .mclass file into a virtual machine (step 106). In this step, the Java virtual machine stores the .mclass file in memory and interprets the byte codes contained in the .mclass file by reading the byte codes and then processing and executing them. Until interpretation of the byte codes is completed, the .mclass file is stored in memory. The byte codes recognized by the Java virtual machine are more clearly described on pp. 151–338 of *The Java Virtual Machine Specification*.

As stated above, the class file format cannot instruct the virtual machine to statically initialize arrays. To compensate for this problem, the Java™ compiler generates a special method, <clinit>, to perform class initialization, including initialization of static arrays. An example of the initialization of a static array follows:

Code Table #1 static int setup[ ]={1, 2, 3, 4};

In this example, an array "setup" contains four integers statically initialized to the following values: 1, 2, 3, and 4.

Given this static initialization, the Java™ compiler creates a <clinit> method that performs the static initialization as functionally described below in pseudo-code:

Code Table #2 temp=new int [4];
    temp=[0]=1;
    temp=[1]=2;
    temp=[2]=3;
    temp=[3]=4;
    this.setup=temp;

As the above code table shows, merely describing the <clinit> method functionally requires a number of statements. More importantly, however, the actual processing of the <clinit> method, performed by byte codes, requires many more statements. These byte codes manipulate a stack resulting in the requested static initialization. A stack is a portion of memory used by the methods in the Java programming environment. The steps performed by the <clinit> method for the example static initialization described above are expressed below in byte codes.

Code Table #3

Method void <clinit>()
    0 iconst_4 //push an integer value of 4 on the stack
    1 newarray int //create a new array of integers and put it
       on the stack.
    3 dup //duplicate top of stack
    4 iconst_0 //push an integer value of 0 on the stack
    5 iconst_1 //push an integer value of 1 on the stack
    6 iastore //store a 1 at index 0 of array
    7 dup //duplicate the top of the stack
    8 iconst_1 //push an integer value of 1 on the stack
    9 iconst_2 //push an integer value of 2 on the stack
    10 iastore //store a 2 at index 1 of array
    11 dup //duplicate top of stack
    12 iconst_2 //push an integer value of 2 on the stack
    13 iconst_3 //push an integer value of 3 on the stack
    14 iastore //store a 3 at index 2 of array
    15 dup //duplicate top of stack
    16 iconst_3 //push an integer of value 3 on stack
    17 iconst_4 //push an integer of value 4 on stack
    18 iastore //store a 4 at index 3 of array
    19 putstatic #3<Field foobar.setup [I> //modify set up
       array according to new array on stack
    22 return Although using the <clinit> method provides the Java™ compiler with a way to instruct the virtual machine to initialize a static array, the amount of code required to initialize the array is many times the size of the array, thus requiring a significant amount of memory. It is therefore desirable to improve static initialization.

SUMMARY OF THE INVENTION

The disclosed system represents an improvement over conventional systems for initializing static arrays by reducing the amount of code executed by the virtual machine to statically initialize an array. To realize this reduction, when consolidating class files, the preloader identifies all <clinit> methods and simulates executing ("play executes") these methods to determine the static initialization performed by them. The preloader then creates an expression indicating the static initialization performed by the <clinit> method and stores this expression in the .mclass file, replacing the <clinit> method. As such, the code of the <clinit> method, containing many instructions, is replaced by a single expression instructing the virtual machine to perform static initialization, thus saving a significant amount of memory. The virtual machine is modified to recognize this expression and perform the appropriate static initialization of an array.

Methods consistent with the present invention receive code to be run on a processing component to perform an operation. The code is then play executed on the memory without running the code on the processing component to identify the operation if the code were run by the processing component. Thereafter, a directive is created for the processing component to perform the operation.

A data processing system consistent with the present invention contains a secondary storage device, a memory, and a processor. The secondary storage device contains a program with source code that statically initializes the data structure and class files, where one of the class files contains a <clinit> method that statically initializes the data structure. The memory contains a compiler for compiling the program and for generating the class files and a preloader for consolidating the class files, for simulating execution of the <clinit> method to determine the static initialization the <clinit> method performs, and for creating an instruction to perform the static initialization. The processor runs the compiler and the preloader.

DETAILED DESCRIPTION OF THE INVENTION

Systems and methods consistent with the present invention provide an improved system for initializing static arrays in the Java™ programming environment by replacing the <clinit> method with one or more directives which, when read by the virtual machine, causes the virtual machine to perform the same static initialization performed by the <clinit> method, except using a significantly less amount of memory and significantly less time. As a result, such systems and methods can significantly reduce memory utilization when statically initializing an array.

Overview

Systems and methods consistent with the present invention eliminate the need for the <clinit> method by performing certain preprocessing in the preloader. Specifically, the preloader receives class files for consolidation and scans them looking for a <clinit> method. When the preloader finds the <clinit method, it simulates execting ("play executes") the <clinit> method against memory to determine the effects that the <clinit> method would have on the memory if interpreted by the Java virtual machine. That is, the preloader simulates execution of the <clinit> method to identify the static initialization that would result had the <clinit> method been executed by the Java™ virtual machine. After identifying this static initialization, the preloader generates one or more directives (or instructions) to cause the same static initialization as the <clinit> method and outputs these directives to the Java virtual machine, thus replacing the <clinit> method. These directives are then read at runtime by the Java virtual machine causing the Java virtual machine to perform the same static initialization performed by the <clinit> method. The directives require significantly less memory space than the <clinit> method. For example, the byte codes described above in code table #3 could be reduced to the following directives contained within the .mclass file indicating that an array of four integers has the initial values 1, 2, 3, and 4:

CONSTANT_Array T_INT 4 1 2 3 4

The virtual machine of an exemplary embodiment recognizes this expression and statically initializes the array to the appropriate values. As a result, the exemplary embodiment reduces memory consumption over conventional systems when initializing a static array.

Implementation Details

Figure 1:
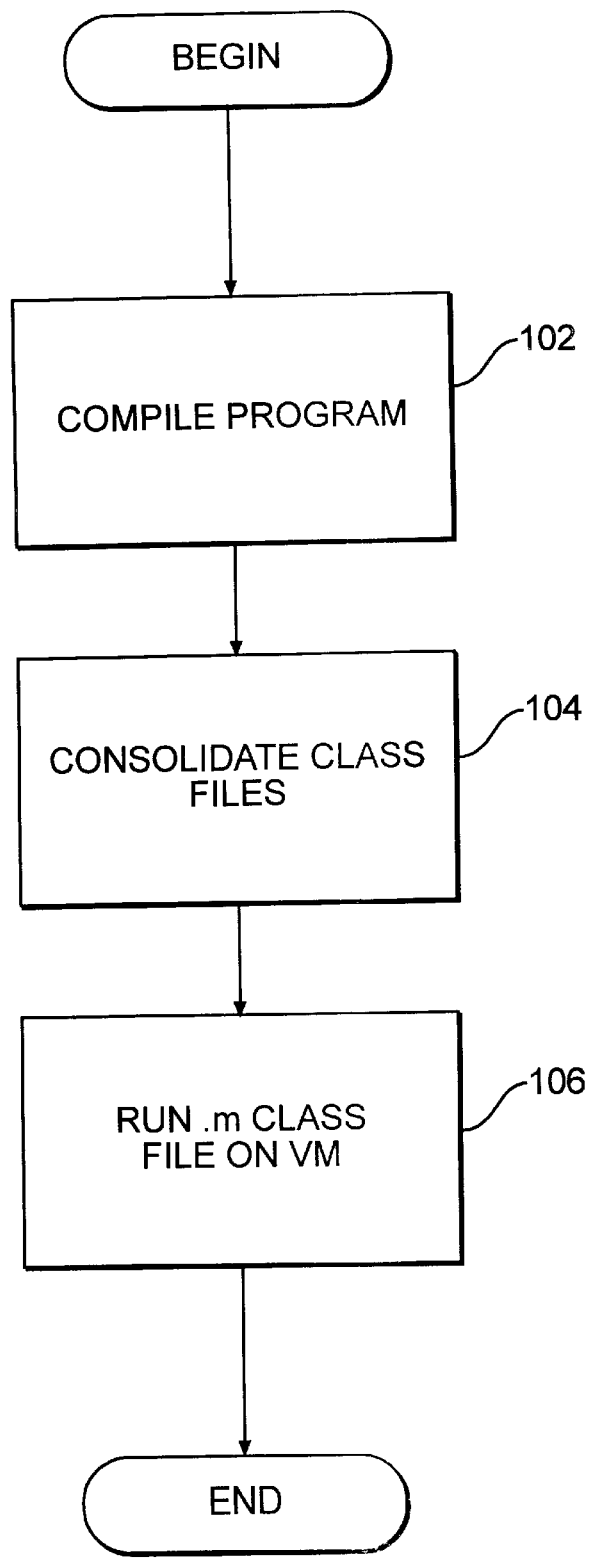
FIG. 1 depicts a flowchart of the steps performed when developing a program in the Java™ programming environment.
Figure 2:
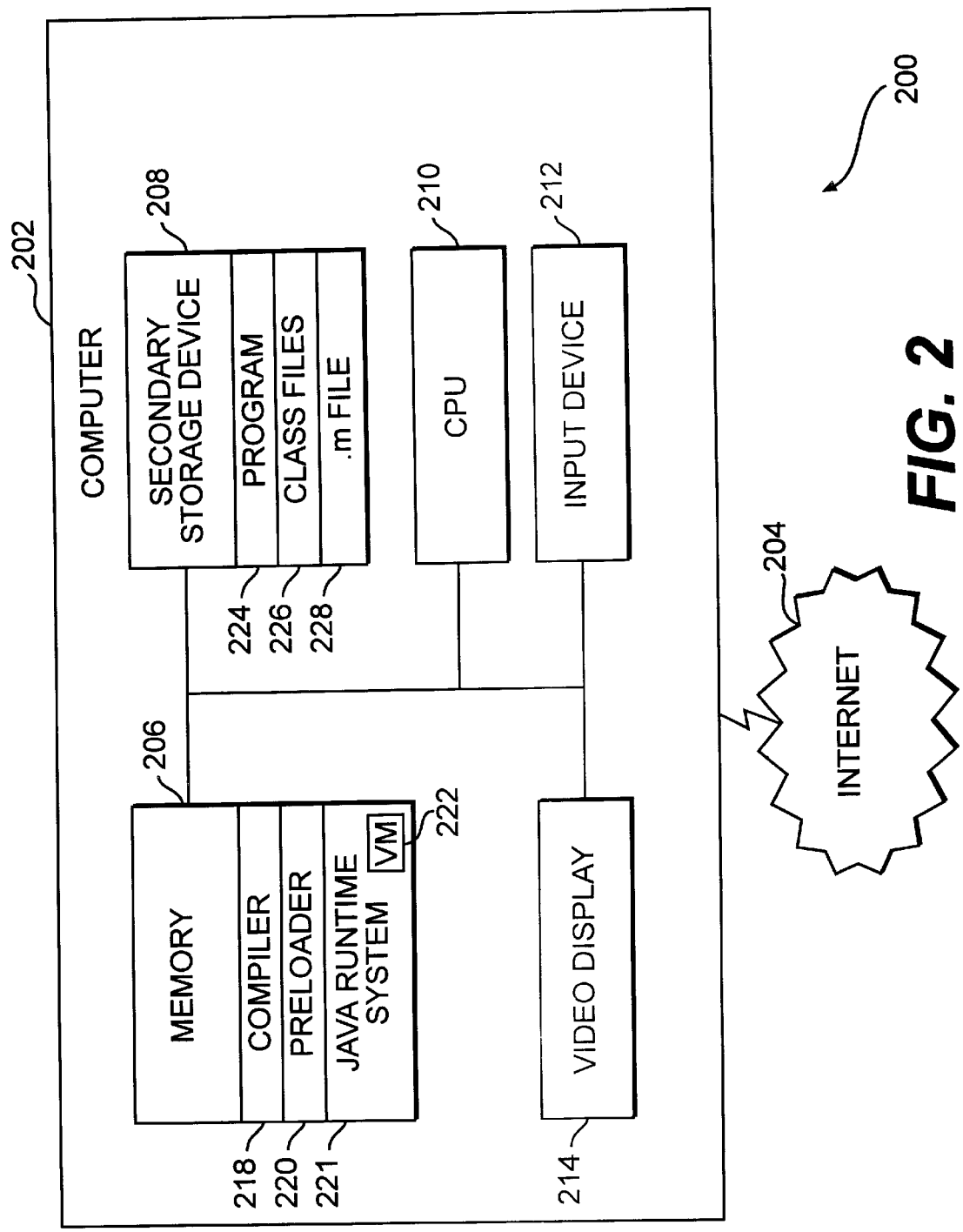
FIG. 2 depicts a data processing system consistent with the present invention.

FIG. 2 depicts a data processing system 200 consistent with the present invention. The data processing system 200 comprises a computer system 202 connected to the Internet 204. Computer system 202 contains a memory 206, a secondary storage device 208, a central processing unit (CPU) 210, an input device 212, and a video display 214. The memory 206 further includes the Java™ compiler 218, the Java™ preloader 220, and the Java™ runtime system 221. The Java™ runtime system 221 includes the Java™ virtual machine 222. The secondary storage device 208 contains a program 224 with source code, various class files 226, and a .mclass file 228. The Java™ compiler 218 compiles the program 224 into one or more class files 226. The preloader 220 then receives the class files 226 and generates a .mclass file 228 representing the consolidation of all of the class files. After consolidation, the .mclass file 228 can be run on the virtual machine 222.

Processing consistent with the present invention is performed by the preloader 220 searching for a <clinit> method, and when it is found, the preloader (1) simulates execution of the <clinit> method to determine the effects it would have on memory if it was interpreted by the virtual machine 222, (2) creates static initialization directives to replicate these effects, and (3) outputs these directives in the .mclass file to replace the <clinit> method, thus saving significant amounts of memory.

In addition, processing consistent with the present invention is performed by the virtual machine 222 because it is modified to recognize the static initialization directives of the preloader. Although an exemplary embodiment of the present invention is described as being stored in memory 206, one skilled in the art will appreciate that it may also be stored on other computer-readable media, such as secondary storage devices like hard disks, floppy disks, or CD-Rom; a carrier wave received from the Internet 204; or other forms of RAM or ROM. Additionally, one skilled in the art will appreciate that computer 202 may contain additional or different components.

The Preloader

Figure 3:
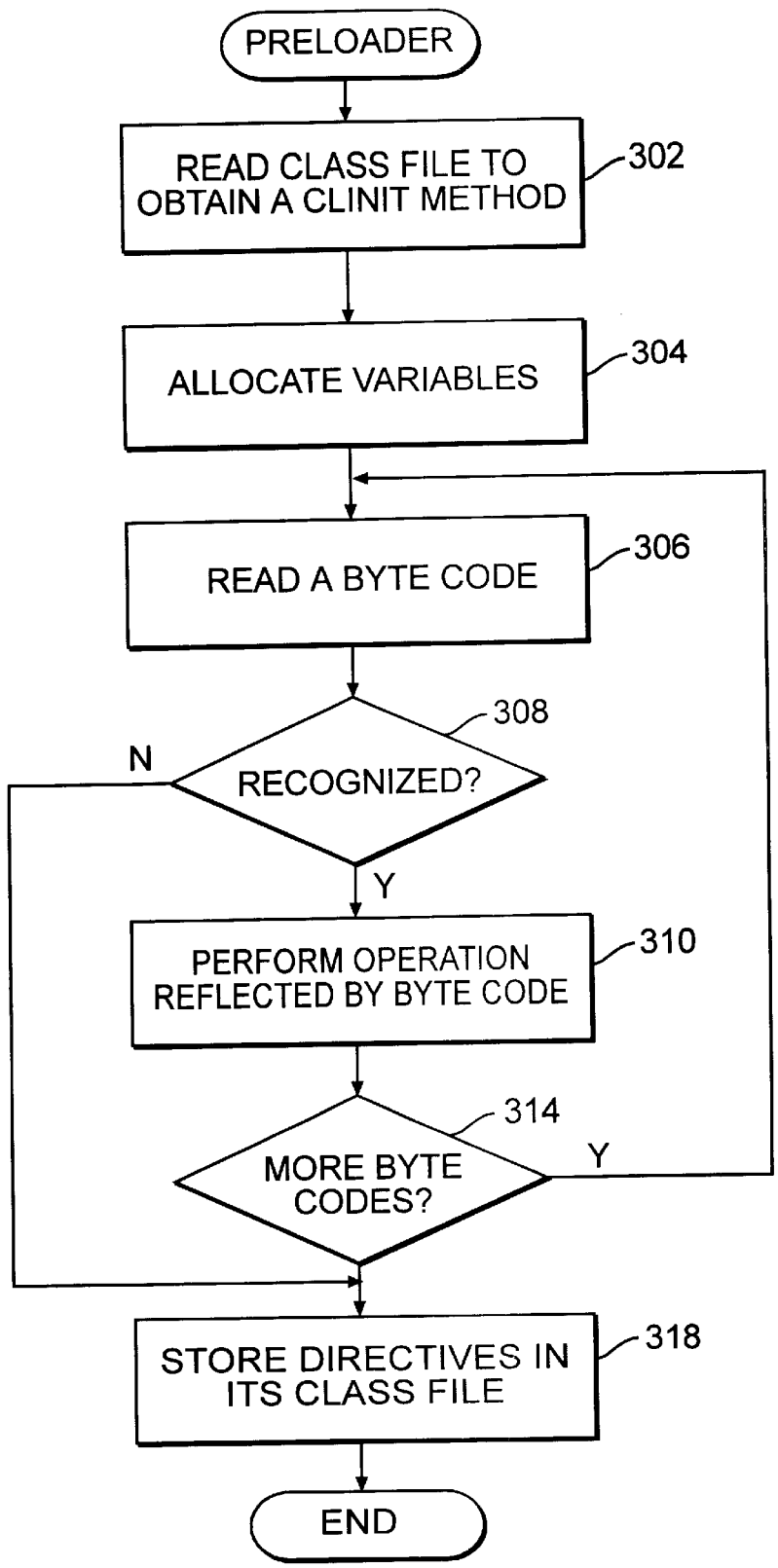
FIG. 3 depicts a flowchart of the steps performed by the preloader depicted in FIG. 2.

FIG. 3 depicts a flowchart of the steps performed by the preloader 220 consistent with the present invention to perform initialization of a static array. The first step performed by the preloader is to read a class file to obtain the <clinit> method (step 302). After obtaining a <clinit> method, the preloader allocates various variables for use during play execution (step 304). When play executing, discussed below, the preloader simulates execution of the byte codes contained in the <clinit> method by the virtual machine. These byte codes manipulate various data structures associated with the <clinit> method, such as the constant pool, the stack, or local variables (or registers).

The constant pool is a table of variable-length structures representing various string constants, class names, field names, and other constants referred to within the class file. The stack is a portion of memory for use in storing operands during the execution of the method. Thus, the size of the stack is the largest amount of space occupied by the operands at any point during execution of this method. The local variables are the variables that are used by this method.

When allocating variables, the preloader obtains a pointer to the constant pool of the <clinit> method, allocates a stack to the appropriate size, and allocates an array such that one entry of the array corresponds to each of the local variables. As described below, the play execution operates on these variables.

After allocating the variables, the preloader reads a byte code from the <clinit> method (step 306). Next, the preloader determines if it recognizes this byte code (step 308). In this step, the preloader recognizes a subset of all byte codes where this subset contains only those byte codes that are generally used to perform static initialization of an array. Following is a list of the byte codes recognized by the preloader of an exemplary embodiment:

Code Table #4

| | |
|---|---|
| aconst_null | iastore |
| iconst_m1 | lastore |
| iconst_0 | fastore |
| iconst_1 | dastore |
| iconst_2 | aastore |
| iconst_3 | bastore |
| iconst_4 | lastore |
| iconst_5 | sastore |
| lconst_0 | dup |
| lconst_1 | newarray |
| fconst_0 | anewarray |
| fconst_1 | return |
| fconst_2 | ldc |
| dconst_0 | ldc_w |
| dconst_1 | ldc2_w |
| bipush | putstatic |
| sipush | |

Any byte codes other than those listed above are not recognized. The appearance of other byte codes beyond those described above indicates that the <clinit> method performs functionality in addition to statically initializing an array. In this case, the <clinit> method cannot be optimized. If a byte code is not recognized, the preloader considers it unsuitable for optimization (or play execution) and processing continues to step 316.

If the preloader recognizes the byte code, however, the preloader performs the operation reflected by the byte code (step 310). In this step, the preloader play executes the byte code on the variables allocated in step 304, and as a result, a value may be popped from the stack, a local variable may be updated, or a value from the constant pool may be retrieved. Additionally, the preloader may encounter a "put static" byte code indicating that a particular static variable (e.g., array) is to be initialized in a particular manner. If the preloader receives such a byte code, it stores an indication of the requested initialization into a hash table for later use. An example of such an entry in the hash table follows:

Setup:=Array (1,2,3,4)

After performing the operation reflected by the byte code, the preloader determines if there are more byte codes in the <clinit> method (step 314). If so, processing returns to step 306. However, if there are no more byte codes, the preloader stores directions in the .mclass file to statically initialize the arrays (step 318). In this step, the preloader stores constant pool entries into the .mclass file like the following:

| Tag | Type | Size | Values |
|---|---|---|---|
| CONSTANT_Array | T_INT | 4 | 1 2 3 4 |

This entry in the constant pool indicates that a particular array has four integers that have the initial values of 1, 2, 3, and 4. At run time, when the virtual machine initializes the class .mclass file, it will encounter a reference to this constant pool entry and create the appropriate array. As a result, the many instructions contained in the <clinit> method are reduced to this one expression, saving significant amounts of memory and time.

Example Implementation of the Preloader

The following pseudo-code describes sample processing of the preloader of an exemplary embodiment. The preloader receives as a parameter a method information data structure that defines the <clinit> method, described in the *Java™ Virtual Machine Specification* at pp. 104–106, and play executes the byte codes of this <clinit> method. It should be noted that the processing described is only exemplary; as such, only a few byte codes are described as being processed by the preloader. However, one skilled in the art will appreciate that all of the byte codes in code table #4 may be processed by the exemplary embodiment.

Code Table #5

```
void emulateByteCodes(Method_info mb)
   int numberRegisters = mb.max_locals();   //number of local variables
   int stackSize = mb.max_stack();          //stack size
   byte byteCode [] = mb.code();            //get the byte code
   ConstantPool constantPool = mb.constantPool();   // get constant pool
   Object stack[] = new Object[stackSize];          //create stack for
                                                    play execution
   Object registers[] = new Object[numberRegisters];  //create local
                                                    variables
                                                    for play
                                                    //execution
   /* Start with an empty stack. */
   int stackTop = -1;                       //just below valid element
   /* Map of static objects */
   Hashtable changes = new Hashtable();
   try {
      boolean success;
      execution_loop:
      for (int codeOffset = 0, nextCodeOffset;
         ;codeOffset = nextCodeOffset) {
         int opcode = byteCode[codeOffset] & 0xFF;   //0..255
         nextCodeOffset = codeOffset + 1;   // the most usual value
         switch(opcode) {
            case opc_iconst_m1:   // push -1 on the stack
               stack[++stackTop] = new Integer(-1);
               break;
            case opc_bipush:
               nextCodeOffset = codeOffset + 2;
               stack[++stackTop] = new Integer(bytecode[codeOffset + 1]);
               break;
            case opc_lload_3:      //load the contents of register 3
               stack[++stackTop] = (Long)register [3];
               stack[++stackTop] = null;   //longs use two words on stack
               break;
            case opc_fsub: {       // subtract top of stack from item below
               float b = stack[stackTop--].floatValue();
               float a = stack[stackTop].floatValue();
```

-continued

Code Table #5

```
        stack[stackTop] = new Float(a − b);
        break;
    }
    case opc_ldc:
        nextCodeOffset = codeOffset + 2;
        stack[++stackTop] =
            constantPool.getItem(byteCode (codeOffset + 1));
        break;
    case sastore: {// store the contents into a "short" array
        short value = (short) (stack[StackTop--].intValue());
        int index = stack[StackTop--].intvalue();
        short[] array = (short[])stack[StackTop--];
        array[index] = value;
        break;
    }
    case opc_putstatic: {
        nextCodeOffset = codeOffset + 3;
        int index = ((byteCode[codeOffset + 1]) & 0xFF) << 8) +
            (byteCode[codeOffset + 2] & 0xFF);
        Field f = constantPool.getItem(byteCode[codeOffset + 1]);
        if (f.getClass() != mb.getClass()) {
            // we can only modify static's in our own class
            throw new RuntimeException();
        }
        Type t = f.getType();
        if (t.isLong() || t.isDouble())
            ++stackTop;
        Object value = stack[++stackTop]
        changes.put(f, value); // put entry into hashtable
        break;
    case opc_return:
        success = true;
        break execution_loop;
    default: // some byte code we do not understand
        success = false;
        break execution_loop;
        }
    }
} catch (RuntimeException) {
    // any runtime exception indicates failure.
    success = false;
}
if (success) {
    <modify .class file as indicated by "changes" hashtable>
    <Remove this <clinit> method from the class>
} else {
    <ran into something we cannot understand>
    <do not replace this method>
}
}
}
```

The Virtual Machine of the Exemplary Embodiment

As stated above, the Java virtual machine 222 is an otherwise standard Java virtual machine as defined in the *Java Virtual Machine Specification,* except that it is modified as will be described below. Conventional virtual machines recognize various constant pool entries, such as CONSTANT_Integer, CONSTANT_String, and CONSTANT_Long. Constant pool entries of these types store various variable information, including the initial value. The virtual machine of an exemplary embodiment, however, additionally recognizes the CONSTANT_Array entry in the constant pool.

The format of the CONSTANT_Array constant pool entry in the class file format follows:

Code Table #6

```
CONSTANT_Array_info {
    u1 tag;            /* The literal value CONSTANT_Array */
```

-continued

Code Table #6

```
    u1 type;           /* see below */
    u4 length;         /* number of elements of the array */
    ux objects[length]; /* Actual values */
    /* The following field is included only if type ==
       T_CLASS */
    u2 type2;          /* index of CONSTANT_Class in constant pool */
}
```

The u1 type field is one of the values listed in the following table:

| Array Type | Value |
|---|---|
| T_CLASS | 2 |
| T_BOOLEAN | 4 |
| T_CHAR | 5 |
| T_FLOAT | 6 |
| T_DOUBLE | 7 |
| T_BYTE | 8 |
| T_SHORT | 9 |
| T_INT | 10 |
| T_LONG | 11 |

The field ux objects[length] is an array of values, providing the elements of the array. The number of elements in the array is given by the length field of the constant pool entry. The actual size of each of these values is shown below:

| Type | ux | Meaning |
|---|---|---|
| T_BOOLEAN, T_BYTE | u1 | 1 byte |
| T_CHAR, T_SHORT, T_CLASS | u2 | 2 bytes |
| T_INT, T_FLOAT | u4 | 4 bytes |
| T_LONG, T_DOUBLE | u8 | 8 bytes |

For all of the above types except for T_CLASS, the bytes shown are the actual value that are stored in that element of the array. For T_CLASS, however, each u2 is itself an index to an entry into the constant pool. The constant pool entry referred to must itself be either a CONSTANT_Array, CONSTANT_Object, or the special constant pool entry 0, indicating a NULL value.

For example, to indicate the following array:

int[ ]={10, 20, 30, 40 };

the constant pool entry would be as follows:

| Tag | Type | Size | Initial Values |
|---|---|---|---|
| CONSTANT_Array | T_INT | 4 | 10 20 30 40 |

As another example, to indicate the following array:

new Foo[3 ]/* all initialized to NULL */ the constant pool entry would be as follows:

| Tag | Type | Size | Initial Values | Class |
|---|---|---|---|---|
| CONSTANT_Array | T_CLASS | 3 | 0 0 0 | XX | where "xx" is an index into the constant pool indicating the class Foo in the constant pool.

Two-dimensional arrays like the following:

new byte[ ][ ]={{1,2,3,4 }, {5,6,7,8 }};

are encoded by having two constant pool entries encode the sub-arrays and by having two additional entries indicate the association between the subarrays. This encoding corresponds to the Java™ notion of an array as a type of object and a multi-dimensional array as an array of arrays. The constant pool entries of the above two-dimensional array follows:

Entry1: CONSTANT_Array T_BYTE 4 1 2 3 4

Entry2: CONSTANT_Array T_BYTE 4 5 6 7 8

Entry3: CONSTANT_Class with name "[[B"

and then

| Tag | Type | Size | Initial Values | Class |
|---|---|---|---|---|
| Entry4: CONSTANT_Array | T_Class | 2 | Entry1 Entry2 | Entry3 | where each of Entry1, Entry2, and Entry3 are the two-byte encodings of the index of the corresponding constant-pool entry.

While the systems and methods of the present invention have been described with reference to a preferred embodiment, those skilled in the art will know of various changes in form and detail which may be made without departing from the spirit and scope of the present invention as defined in the appended claims.

What is claimed is:

1. A method in a data processing system for statically initializing an array, comprising the steps of:
    compiling source code containing the array with static values to generate a class file with a clinit method containing byte codes to statically initialize the array to the static values;
    receiving the class file into a preloader;
    simulating execution of the byte codes of the clinit method against a memory without executing the byte codes to identify the static initialization of the array by the preloader;
    storing into an output file an instruction requesting the static initialization of the array; and
    interpreting the instruction by a virtual machine to perform the static initialization of the array.

2. The method of claim 1 wherein the storing step includes step of:
    storing a constant pool entry into the constant pool.

3. The method of claim 1 wherein the play executing step includes the steps of:
    allocating a stack;
    reading a byte code from the clinit method that manipulates the stack; and
    performing the stack manipulation on the allocated stack.

4. The method of claim 1 wherein the play executing step includes the steps of:
    allocating variables;
    reading a byte code from the clinit method that manipulates local variables of the clinit method; and
    performing the manipulation of the local variables on the allocated variables.

5. The method of claim 1 wherein the play executing step includes the steps of:
    obtaining a reference to a constant pool of the clinit method;
    reading a byte code from the clinit method that manipulates the constant pool; and
    performing the constant pool manipulation.

6. A method in a data processing system, comprising the steps of:
    receiving code to be run on a processing component to perform an operation;
    play executing the code without running the code on the processing component to identify the operation if the code were run by the processing component; and
    creating an instruction for the processing component to perform the operation.

7. The method of claim 6 wherein the operation initializes a data structure, and wherein the play executing step includes the step of:
    play executing the code to identify the initialization of the data structure.

8. The method of claim 6 wherein the operation statically initializes an array and wherein the play executing step includes the step of:
    play executing the code to identify the static initialization of the array.

9. The method of claim 6 further including the step of:
    running the created instruction on the processing component to perform the operation.

10. The method of claim 6 further including the step of:
    interpreting the created instruction by a virtual machine to perform the operation.

11. The method of claim 6 wherein the operation has an effect on memory, and wherein the play executing step includes the step of:
    play executing the code to identify the effect on the memory.

12. A data processing system comprising:
    a storage device containing:
        a program with source code that statically initializes a data structure; and
        class files, wherein one of the class files contains a clinit method that statically initializes the data structure;
    a memory containing:
        a compiler for compiling the program and generating the class files; and
        a preloader for consolidating the class files, for play executing the clinit method to determine the static initialization the clinit method performs, and for creating an instruction to perform the static initialization; and
    a processor for running the compiler and the preloader.

13. The data processing system of claim 12 wherein the preloader includes a mechanism for generating an output file containing the created instruction.

14. The data processing system of claim 13 wherein the memory further includes a virtual machine that interprets the created instruction to perform the static initialization.

15. The data processing system of claim 12, wherein the data structure is an array.

16. The data processing system of claim 12 wherein the clinit method has byte codes that statically initialize the data structure.

17. The data processing system of claim 12 wherein the created instruction includes an entry into a constant pool.

18. A computer-readable medium containing instructions for controlling a data processing system to perform a method, comprising the steps of:

receiving code to be run on a processing component to perform an operation;

simulating execution of the code without running the code on the processing component to identify the operation if the code were run by the processing component; and creating an instruction for the processing component to perform the operation.

19. The computer-readable medium of claim 18 wherein the operation initializes a data structure, and wherein the simulating step includes the step of:

simulating execution of the code to identify the initialization of the data structure.

20. The computer-readable medium of claim 18 wherein the operation statically initializes an array and wherein the simulating step includes the step of:

simulating execution of the code to identify the static initialization of the array.

21. The computer-readable medium of claim 18 further including the step of:

running the created instruction on the processing component to perform the operation.

22. The computer-readable medium of claim 18 further including the step of:

interpreting the created instruction by a virtual machine to perform the operation.

23. The computer-readable medium of claim 18 wherein the operation has an effect on memory, and wherein the simulating step includes the step of:

simulating execution of the code to identify the effect on the memory.

* * * * *

(12) EX PARTE REEXAMINATION CERTIFICATE (8658th)
United States Patent
Yellin et al.

(10) Number: US 6,061,520 C1
(45) Certificate Issued: Nov. 15, 2011

(54) METHOD AND SYSTEM FOR PERFORMING STATIC INITIALIZATION

(75) Inventors: Frank Yellin, Redwood City, CA (US); Richard D. Tuck, San Francisco, CA (US)

(73) Assignee: Sun Microsystems, Inc., Palo Alto, CA (US)

Reexamination Request:
No. 90/011,489, Feb. 17, 2011

Reexamination Certificate for:
Patent No.: 6,061,520
Issued: May 9, 2000
Appl. No.: 09/055,947
Filed: Apr. 7, 1998

(51) Int. Cl.
*G06F 9/45* (2006.01)
*G06F 9/445* (2006.01)

(52) U.S. Cl. .................. 717/148; 703/22; 717/151; 718/100

(58) Field of Classification Search .............. 395/705
See application file for complete search history.

(56) References Cited

To view the complete listing of prior art documents cited during the proceeding for Reexamination Control Number 90/011,489, please refer to the USPTO's public Patent Application Information Retrieval (PAIR) system under the Display References tab.

*Primary Examiner* — Eric B Kiss

(57) ABSTRACT

The disclosed system represents an improvement over conventional systems for initializing static arrays by reducing the amount of code executed by the virtual machine to statically initialize an array. To realize this reduction, when consolidating class files, the preloader identifies all <clinit> methods and play executes these methods to determine the static initialization performed by them. The preloader then creates an expression indicating the static initialization performed by the <clinit> method and stores this expression in the .mclass file, replacing the <clinit> method. As such, the code of the <clinit> method, containing many instructions, is replaced by a single expression instructing the virtual machine to perform static initialization, thus saving a significant amount of memory. The virtual machine is modified to recognize this expression and perform the appropriate static initialization of an array.

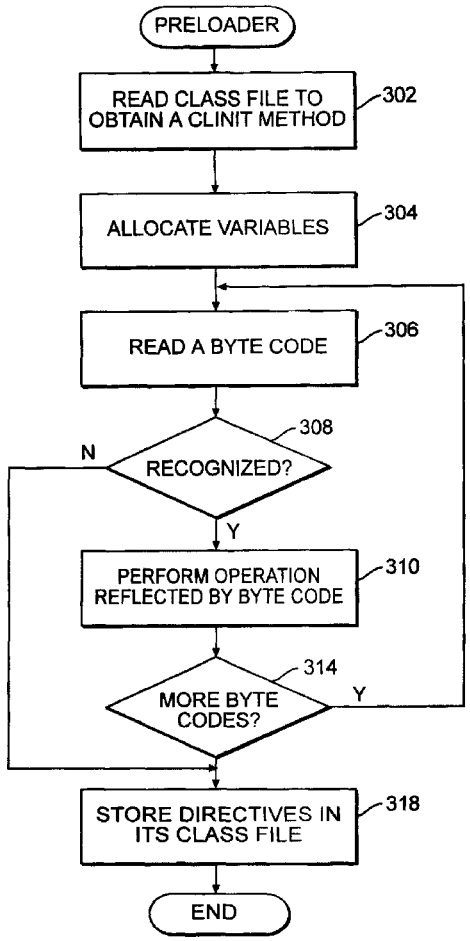

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-4, 8, 10, 12-17, 20 and 22 is confirmed.

Claims 6, 7, 9, 11, 18, 19, 21 and 23 are cancelled.

Claim 5 was not reexamined.

* * * * *